United States Patent
Lee et al.

(10) Patent No.: US 12,411,252 B2
(45) Date of Patent: Sep. 9, 2025

(54) METHOD FOR RECOGNIZING VEHICLE LOCATION USING GEOMAGNETIC SENSOR

(71) Applicant: KOREA INSTITUTE OF SCIENCE AND TECHNOLOGY, Seoul (KR)

(72) Inventors: Taikjin Lee, Seoul (KR); Beomju Shin, Seoul (KR); Jungho Lee, Seoul (KR); Changsu Yu, Seoul (KR); Taehun Kim, Seoul (KR); Chulki Kim, Seoul (KR); Jaehun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 387 days.

(21) Appl. No.: 17/989,246

(22) Filed: Nov. 17, 2022

(65) Prior Publication Data
US 2024/0019586 A1    Jan. 18, 2024

(30) Foreign Application Priority Data
Jul. 12, 2022    (KR) .................. 10-2022-0085931

(51) Int. Cl.
*G01S 19/48* (2010.01)
*G01C 17/38* (2006.01)
*G01C 21/08* (2006.01)

(52) U.S. Cl.
CPC ............. *G01S 19/48* (2013.01); *G01C 17/38* (2013.01); *G01C 21/08* (2013.01)

(58) Field of Classification Search
CPC ......... G01S 19/78; G01S 19/49; G01C 17/38; G01C 21/08
See application file for complete search history.

(56) References Cited

U.S. PATENT DOCUMENTS

| | | | | |
|---|---|---|---|---|
| 8,305,264 | B1 * | 11/2012 | Jones | ...................... G01S 19/46 |
| | | | | 342/357.55 |
| 2007/0005243 | A1 * | 1/2007 | Horvitz | .................. G01S 19/14 |
| | | | | 701/484 |
| 2008/0051987 | A1 * | 2/2008 | Okeya | .................... G01C 17/38 |
| | | | | 701/449 |

(Continued)

FOREIGN PATENT DOCUMENTS

| | | | | |
|---|---|---|---|---|
| CN | 108151765 A | * | 6/2018 | ............. G01C 21/08 |
| JP | 2004182006 A | * | 7/2004 | ............. G02C 7/101 |
| JP | 2005-195387 A | | 7/2005 | |

(Continued)

OTHER PUBLICATIONS

Korean Office Action Issued on Nov. 23, 2024, in Counterpart Korean Patent Application No. 10-2022-0085931 (5 Pages in English, 5 Pages in Korean).

*Primary Examiner* — Vladimir Magloire
*Assistant Examiner* — Fred H Mull
(74) *Attorney, Agent, or Firm* — NSIP Law (57) ABSTRACT

The present disclosure relates to a method for performing vehicle position recognition using a geomagnetic sensor by calibrating the geomagnetic sensor on the basis of a geomagnetic sensor value stored in a database in advance before entrance to an area in which position recognition through a GPS is impossible. Thus, it is possible to accurately detect a position of a vehicle using the geomagnetic sensor even in a structure such as a tunnel.

6 Claims, 5 Drawing Sheets

(56) References Cited

U.S. PATENT DOCUMENTS

2011/0163914 A1\* 7/2011 Seymour ................ G01S 19/34
342/357.42

FOREIGN PATENT DOCUMENTS

| | | |
|---|---|---|
| JP | 5556101 B2 | 7/2014 |
| KR | 10-2006-0102016 A | 9/2006 |
| KR | 10-2016-0002103 A | 1/2016 |
| KR | 10-2016-0143002 A | 12/2016 |
| WO | WO 2010/095197 A1 | 8/2010 |

\* cited by examiner

| | Mean (m) | RMSE (m) | CEP90 (m) |
|---|---|---|---|
| LTE | 43 | 103 | 180 |

| | Mean (m) | RMSE (m) | CEP90 (m) |
|---|---|---|---|
| GEOMAGNETIC SENSOR | 4.9 | 13.0 | 18 |

METHOD FOR RECOGNIZING VEHICLE LOCATION USING GEOMAGNETIC SENSOR

CROSS-REFERENCE TO RELATED APPLICATION

This application is based on and claims priority under 35 U.S.C. 119 to Korean Patent Application No. 10-2022-0085931, filed on Jul. 12, 2022, the contents of which are all hereby incorporated by reference herein in their entirety.

BACKGROUND OF INVENTION

Field of the Invention

The present disclosure relates to a vehicle position recognition method using a geomagnetic sensor, and more particularly, to a method for recognizing a vehicle position using a geomagnetic sensor by calibrating the geomagnetic sensor before entrance to an area in which position recognition through a GPS is impossible.

Related Art

In general, a global positioning system (GPS) is a system that allows a position to be accurately ascertained using artificial satellites, and performs navigation through connection with various communication networks together with such a GPS. For example, a system that provides position information, which is mounted in a vehicle, is referred to as a car navigation system (CNS).

As smartphones become popular, an application is installed in the smartphone so that the smartphone is used as a navigation system. However, since such a navigation system receives a satellite signal from an artificial satellite and uses the satellite signal, the navigation system is not available in an indoor space such as a tunnel or an underground parking lot of a building in which the satellite signal is not received from the artificial satellite.

Meanwhile, in a commercialized position detection technology, position detection using a GPS may have poor accuracy at the time of passage of a structure such as the tunnel as described above, and position detection using an RFID has high infrastructure construction and maintenance costs. In addition, application of a technology using an LTE signal to a navigation application of a smart phone has somewhat insufficient actual position recognition accuracy because of a spatial resolution of the LTE signal of tens of meters. Thus, a technology capable of detecting an accurate position while reducing an installation cost is required.

A position of a mobile means can be detected by using a geomagnetic sensor in order to achieve high-accuracy position detection while improving cost efficiency. Since a geomagnetic value generally has a spatial resolution of several meters, satisfactory actual positional accuracy can be obtained. However, in order to use a geomagnetic sensor of a smartphone, it is always necessary to calibrate the geomagnetic sensor.

SUMMARY

The present disclosure has been made to solve the problems of the related art as described above, and provides a method for performing vehicle position recognition using a geomagnetic sensor by calibrating the geomagnetic sensor on the basis of a geomagnetic sensor value stored in a database in advance before entrance to an area in which position recognition through a GPS is impossible.

In order to solve the above technical problem, a vehicle position recognition method using a geomagnetic sensor according to an embodiment of the present disclosure may include: recognizing a position of a vehicle through a GPS before entrance to an area in which position recognition through the GPS is impossible; measuring a geomagnetic sensor value of a user device at the recognized position of the vehicle; loading, to the user device, a geomagnetic value measured and stored in a database in advance at the recognized position of the vehicle; comparing the geomagnetic value loaded through the database with a geomagnetic sensor value measured by the user device and calibrating a geomagnetic sensor of the user device on the basis of the geomagnetic value loaded through the database; and recognizing the position of the vehicle in the area in which the position recognition is impossible by using the calibrated geomagnetic sensor of the user device.

In the vehicle position recognition method according to the embodiment of the present disclosure, when the vehicle passes through several areas in which position recognition through a GPS is impossible, the geomagnetic sensor of the user device may perform the calibration each time before entrance to the area in which the position recognition through the GPS is impossible.

In the vehicle position recognition method according to the embodiment of the present disclosure, the geomagnetic value stored in the database may be periodically updated in a manner including user feedback, and the updated geomagnetic value may be able to be loaded to the user device.

In the vehicle position recognition method according to the embodiment of the present disclosure, the area in which the position recognition through the GPS is impossible may be a tunnel.

The vehicle position recognition method using a geomagnetic sensor according to the embodiment of the present disclosure provides the following effects.

It is possible to accurately detect the position of the vehicle using the geomagnetic sensor even in a structure such as a tunnel by calibrating the geomagnetic sensor on the basis of the geomagnetic sensor value stored in the database in advance before entrance to an area in which position recognition through a GPS is impossible.

It is possible to accurately detect the position of the vehicle independent of an error of the geomagnetic sensor value that may occur depending on a device type at the time of construction of a database by calibrating the geomagnetic sensor of the user device each time before entrance to a number of structures such as tunnels when the vehicle passes through the number of structures.

The geomagnetic value measured and stored in the database in advance can be periodically updated to reflect change in environment in the area in which the position recognition through the GPS is impossible, and to reflect the change in environment more rapidly and accurately by including user feedback.

DESCRIPTION OF EXEMPLARY EMBODIMENTS

Hereinafter, the present disclosure will be described in detail with reference to embodiments and drawings. However, the following description is not intended to limit the present disclosure to specific embodiments, and when a determination is made that detailed description of known related technologies may obscure the gist of the present disclosure in describing the present disclosure, the detailed description will be omitted.

An existing vehicle navigation service using an application of an electronic device depends on a GPS, making it difficult to utilize in a tunnel or an underground parking lot. A vehicle recognition technology using an LTE signal in a structure such as a tunnel somewhat lacks actual position accuracy. On the other hand, when a position is recognized using a geomagnetic sensor, satisfactory actual position accuracy can be obtained. However, it is always necessary to calibrate a geomagnetic sensor of a smartphone in order to use the geomagnetic sensor.

Figure 1:
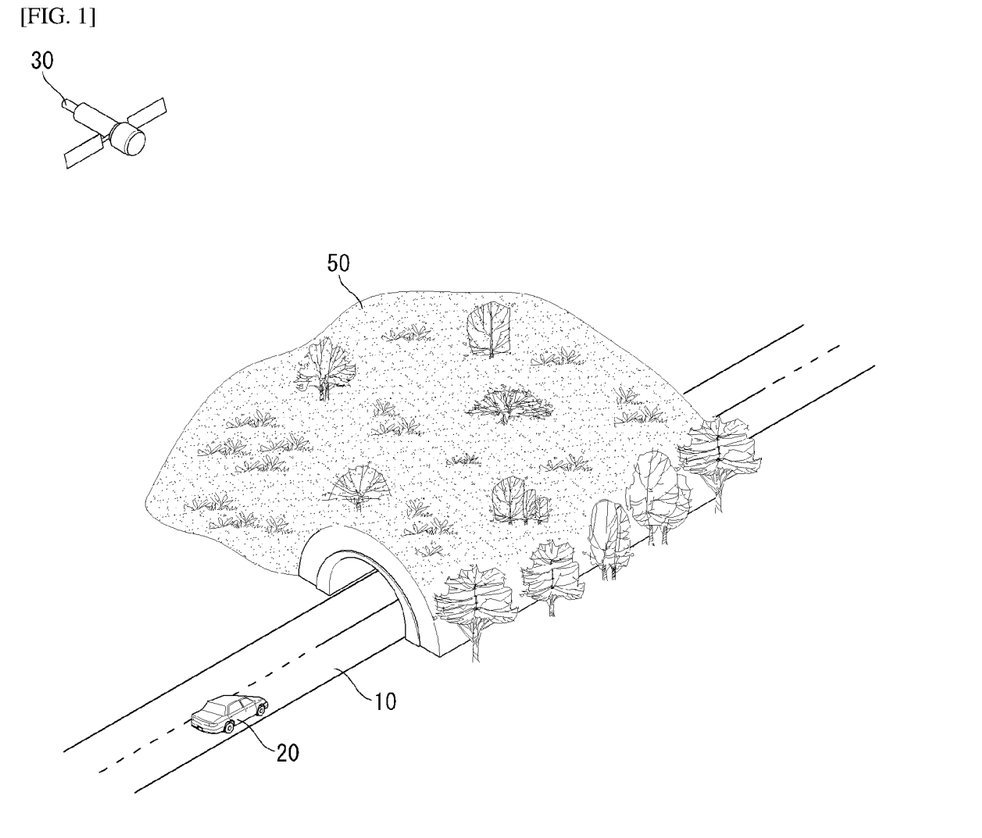
FIG. 1 is an illustrative diagram for explaining vehicle position recognition using a geomagnetic sensor according to an embodiment of the present disclosure.

FIG. 1 is an illustrative diagram for explaining vehicle position recognition using a geomagnetic sensor according to an embodiment of the present disclosure.

In the embodiment of the present disclosure, a mobile means 20 such as a vehicle (hereinafter referred to as a vehicle for convenience of description) may recognize a position of the vehicle 20 by receiving a satellite signal through a GPS satellite 30 at one position 10 before entrance to an area 50 in which position recognition through a GPS is impossible, including a structure such as a tunnel (hereinafter referred to as a tunnel for convenience of description).

A geomagnetic sensor should be used in order to recognize the position of the vehicle inside the tunnel 50, and a process of calibrating the geomagnetic sensor before entrance to the tunnel 50 is required in order to perform high-accuracy position recognition using the geomagnetic sensor. Accordingly, a sensor value of a user device is measured at the position of the vehicle 20 recognized through the GPS, and a geomagnetic sensor value at the position 10 is acquired.

In order to calibrate the geomagnetic sensor, a geomagnetic value that is a reference for comparison with the geomagnetic sensor value measured by the user device is required. The geomagnetic value that is a comparison reference at the position 10 before entrance to the tunnel 50 is measured and stored in a database of the server in advance, and the user device may connect to the server through wireless communication, receive the geomagnetic value at the position 10 stored in the database, and use the geomagnetic value.

The geomagnetic value stored in the database in advance at the position 10 is compared with the geomagnetic sensor value measured by the user device, and the geomagnetic sensor of the user device is calibrated. It is possible to recognize the position of the vehicle 20 inside the tunnel 50 in which position recognition through a GPS is impossible, by using the calibrated geomagnetic sensor of the user device.

Figure 2:
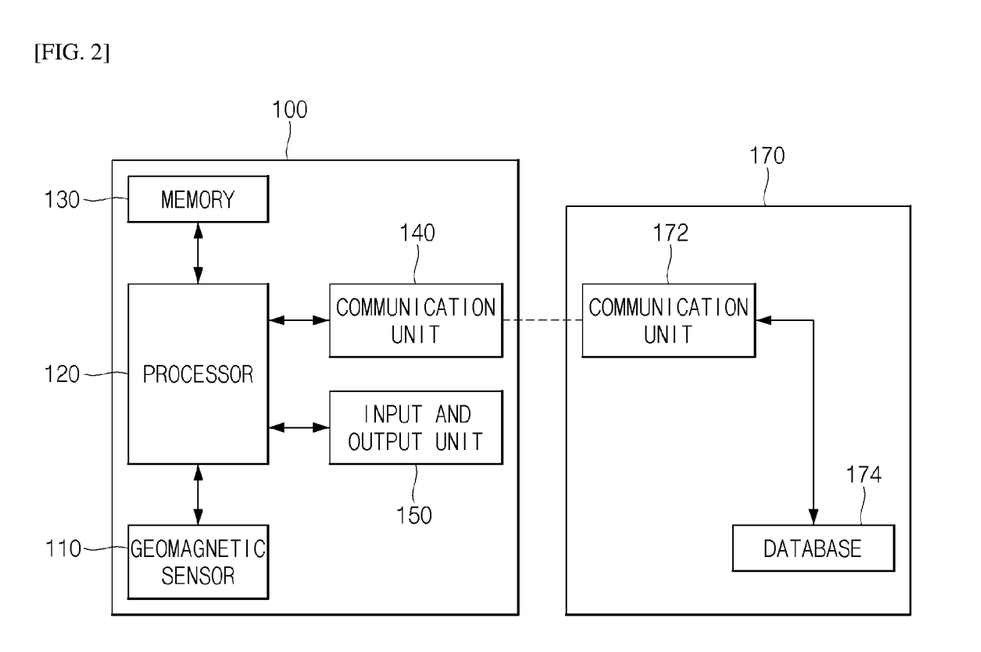
FIG. 2 is a block diagram conceptually illustrating a configuration of a user device according to an embodiment of the present disclosure.

FIG. 2 is a block diagram conceptually illustrating a configuration of the user device according to the embodiment of the present disclosure.

A user device 100 used for vehicle position recognition may be a mobile device of a user such as a smart phone, a mobile phone, a laptop computer, a digital broadcasting terminal, a personal digital assistant (PDA), a portable multimedia player (PMP), or a tablet PC. The user device 100 may include a geomagnetic sensor 110, a processor 120, a memory 130, a communication unit 140, and an input and output unit 150, and a server 170 that provides calibration information for a geomagnetic sensor stored in a database 174 may also have the same or similar internal configuration.

The geomagnetic sensor 110 measures an Earth's magnetic field at a certain position and may be configured of an MEMS. Measurement of geomagnetism is performed in all three-dimensional directions of x, y, and z axes, and a geomagnetic value measured by rotating a sensor in several directions at the same point has a three-dimensional elliptical form. A magneto resistive (MR) sensor, a magneto inductive (MI) sensor, or a flux gate sensor, for example, may be used for a terminal.

The processor 120 may be configured to process instructions of a computer program by performing basic arithmetic, logic, and input and output operations. The instructions may be provided to the processor 120 by the memory 130 or the communication unit 140. For example, the processor 120 may be configured to execute the received instructions according to a program code stored in a recording device such as the memory 130.

The memory 130 is a computer-readable recording medium and may include a random access memory (RAM), a read only memory (ROM), and a permanent mass storage device such as a disc drive. Further, an operating system or at least one program code may be stored in the memory 130, and more specifically, code for a browser, a dedicated application, or the like installed and driven in the user device 100 may be stored.

The communication unit 140 may provide a function for communication between the user device 100 and the server 170 through wireless communication, and may provide a function for communication with another electronic device or another server. For the wireless communication, for example, a cellular communication protocol such as at least one of long-term evolution (LTE), LTE Advance (LTE-A), code division multiple access (CDMA), wideband CDMA (WCDMA), a universal mobile telecommunications system (UMTS), a wireless broadband (WiBro), a global system for mobile communications (GSM), and the like may be used.

The input and output unit 150 may be, for example, a touch screen in which input and output functions are integrated into one in the case of a smart device. For example, the processor 120 may process instructions of a computer program loaded to the memory 130 in response to a user input through the touch screen, and a result of the processing or a service screen may be displayed on a display.

Further, in other embodiments, the user device 100 and the server 170 may include more components than those in FIG. 2. However, a clear illustration of most of components in the related art is omitted. For example, the user device 100 is implemented to include at least a portion of the above-described input and output unit 150 or may further include other components such as a transceiver, a global positioning system (GPS) module, cameras, various sensors, and a database.

The server 170 may include the database 174 in which information for calibrating the geomagnetic sensor 110 of the user device 100 is stored, and may transmit or receive data to or from the user device 100 through wireless communication.

The geomagnetic value stored in the database 174 may periodically updated, the updated geomagnetic value may be loaded to the user device 100 and used, and the periodic update of the database 174 may include a manner using feedback from the user device.

Figure 3:
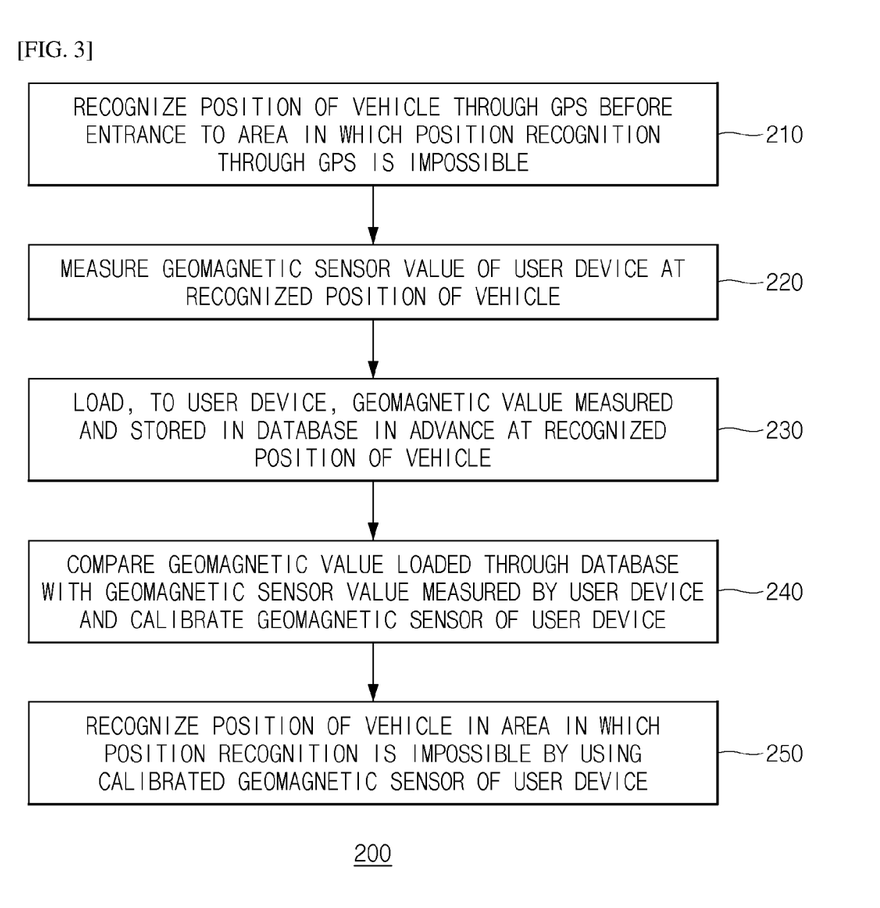
FIG. 3 is a flowchart of a vehicle position recognition method using a geomagnetic sensor according to an embodiment of the present disclosure.

FIG. 3 is a flowchart of a vehicle position recognition method using a geomagnetic sensor according to an embodiment of the present disclosure.

In the embodiment of the present disclosure, a method 200 for recognizing a vehicle position using a geomagnetic sensor may include a step 210 of recognizing the position of the vehicle through a GPS before entrance to an area in which position recognition through a GPS is impossible, a step 220 of measuring a geomagnetic sensor value of a user device at the recognized position of the vehicle, a step 230 of loading, to the user device, a geomagnetic value measured and stored in a database in advance at the recognized position of the vehicle, a step 240 of comparing the geomagnetic value loaded through the database with a geomagnetic sensor value measured by the user device and calibrating a geomagnetic sensor of the user device on the basis of the geomagnetic value loaded through the database, and a step 250 of recognizing the position of the vehicle in the area in which the position recognition is impossible by using the calibrated geomagnetic sensor of the user device.

In an embodiment, a fingerprint algorithm that is a probabilistic modeling method among position measurement techniques may be used to apply an Earth's magnetic field to position measurement inside a structure such as a tunnel. In this case, the Earth's magnetic field can be used for position measurement even when no special infrastructure is installed inside the structure such as the tunnel.

The technique using the fingerprint algorithm is a positioning technique based on probabilistic modeling, which is a scheme in which noise and surrounding environment information are utilized as information for position tracking, and construction of a database is required to perform position estimation.

In an embodiment, the database may be constructed by ascertaining a geomagnetic property of a sample area of at least a part of a target area for ascertaining a user position using geomagnetic values collected from the sample area, and generating a geomagnetic map using geomagnetic values of a target area collected at sampling intervals for the target area determined based on the geomagnetic property.

In the embodiment of the present disclosure, the calibration of the geomagnetic sensor is performed to match a measurement center of the geomagnetic sensor in which a shift phenomenon occurs to a center in a normal case through comparison of the geomagnetic sensor value measured by the user device with the geomagnetic value stored in the database in advance at a relevant position.

In an embodiment, in recognition of the position of the vehicle through a GPS before entrance to the area in which the position recognition through the GPS is impossible, first, a position recognized through the GPS as the vehicle moves and a geomagnetic value measured at the position may be recorded as a pair, and then, when a loss of a GPS signal is detected, the position of the vehicle before the entrance to the area in which the position recognition is impossible may be determined from the last recorded pair of position and geomagnetic value.

In another embodiment, a shaded area map may be constructed from information on the area in which the position recognition through the GPS is impossible in advance and utilized. In such an embodiment, in the recognition of the position of the vehicle through the GPS before entrance to the area in which the position recognition through the GPS is impossible, first, a point in time at which the vehicle enters the area in which the position recognition through the GPS is impossible as the vehicle moves may be predicted on the basis of the shaded area map, and then, the position of the vehicle may be acquired through the GPS at the predicted point in time at which the vehicle enters the area in which the position recognition through the GPS is impossible.

Figure 4:
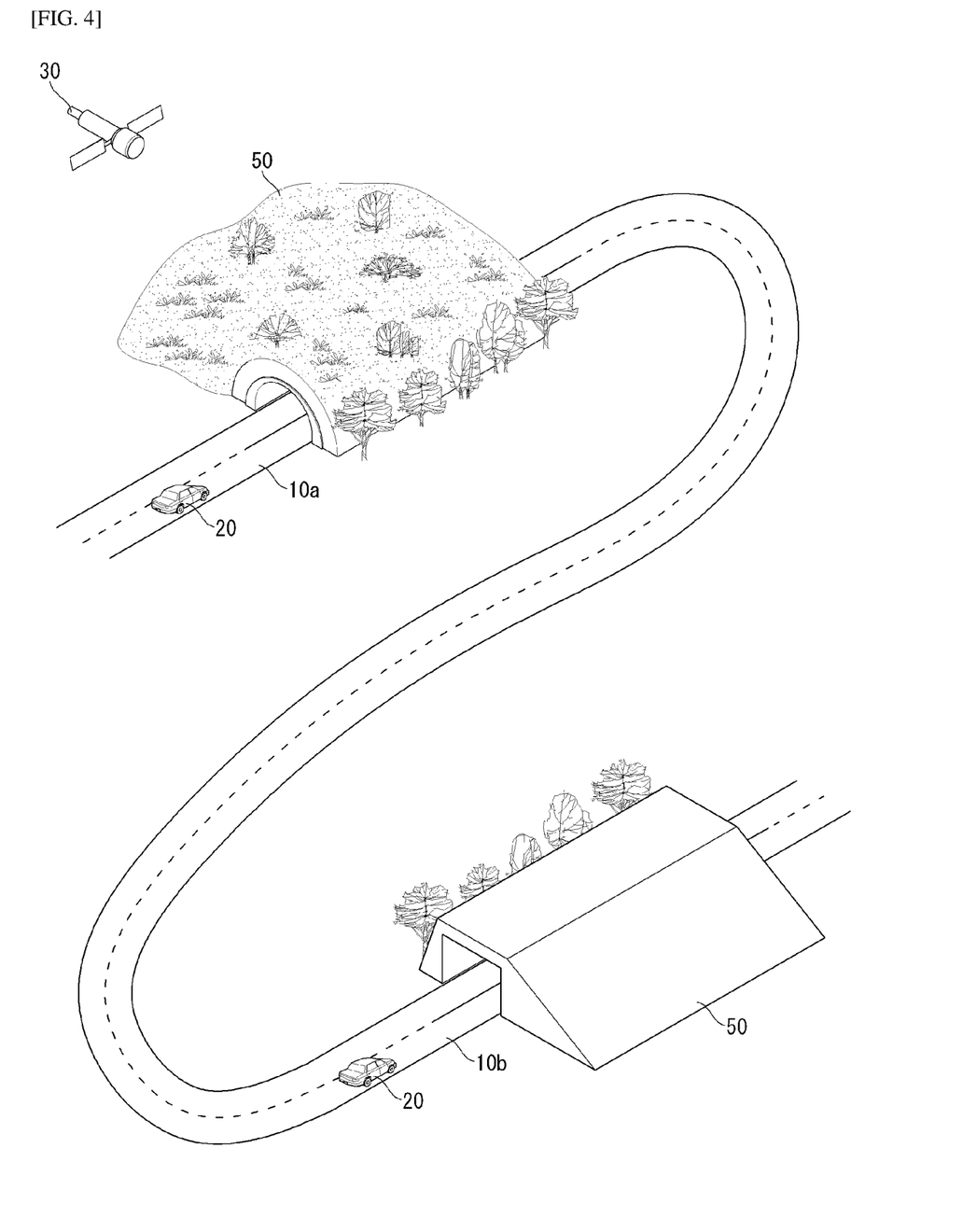
FIG. 4 is an illustrative diagram for explaining vehicle position recognition using a geomagnetic sensor when a vehicle passes through several areas in which position recognition through a GPS is impossible according to the embodiment of the present disclosure.

FIG. 4 is an illustrative diagram for explaining vehicle position recognition using a geomagnetic sensor when a vehicle passes through several areas in which the position recognition through the GPS is impossible according to the embodiment of the present disclosure.

In the embodiment of the present disclosure, when the vehicle 20 passes through several areas 50 in which position recognition through a GPS is impossible, the geomagnetic sensor of the user device can perform calibration each time before the vehicle 20 enters the area 50 in which the position recognition through the GPS is impossible.

In other words, in a situation in which the vehicle 20 passes through several tunnels the geomagnetic sensor of the user device is calibrated each time at one position 10a or 10b before the vehicle 20 enters the tunnel 50 in which the position recognition through the GPS is impossible, making it possible to maintain the accuracy of position measurement inside each tunnel 50.

A geomagnetic value at the one position stored in the database may change depending on change in environment, and in the case of devices that measure the geomagnetic value, different devices may be used at respective measurement positions, and thus, it is possible to detect the position of the vehicle inside the tunnel more accurately independent of an error of the geomagnetic sensor value that may occur.

In the embodiment of the present disclosure, the geomagnetic value stored in the database may be periodically updated in a manner including user feedback, and the updated geomagnetic value may be loaded to the user device.

As described above, since the geomagnetic value at the one position stored in the database may change depending on change in environment, the geomagnetic value should be updated so that this change is periodically reflected. Further, this update is not limited to measurement and investigation of the geomagnetic sensor in a separate manner, and the update is made so that feedback from the user device is reflected, thereby making it possible to construct a database for the calibration of the geomagnetic sensor cost-effectively.

Figure 5:
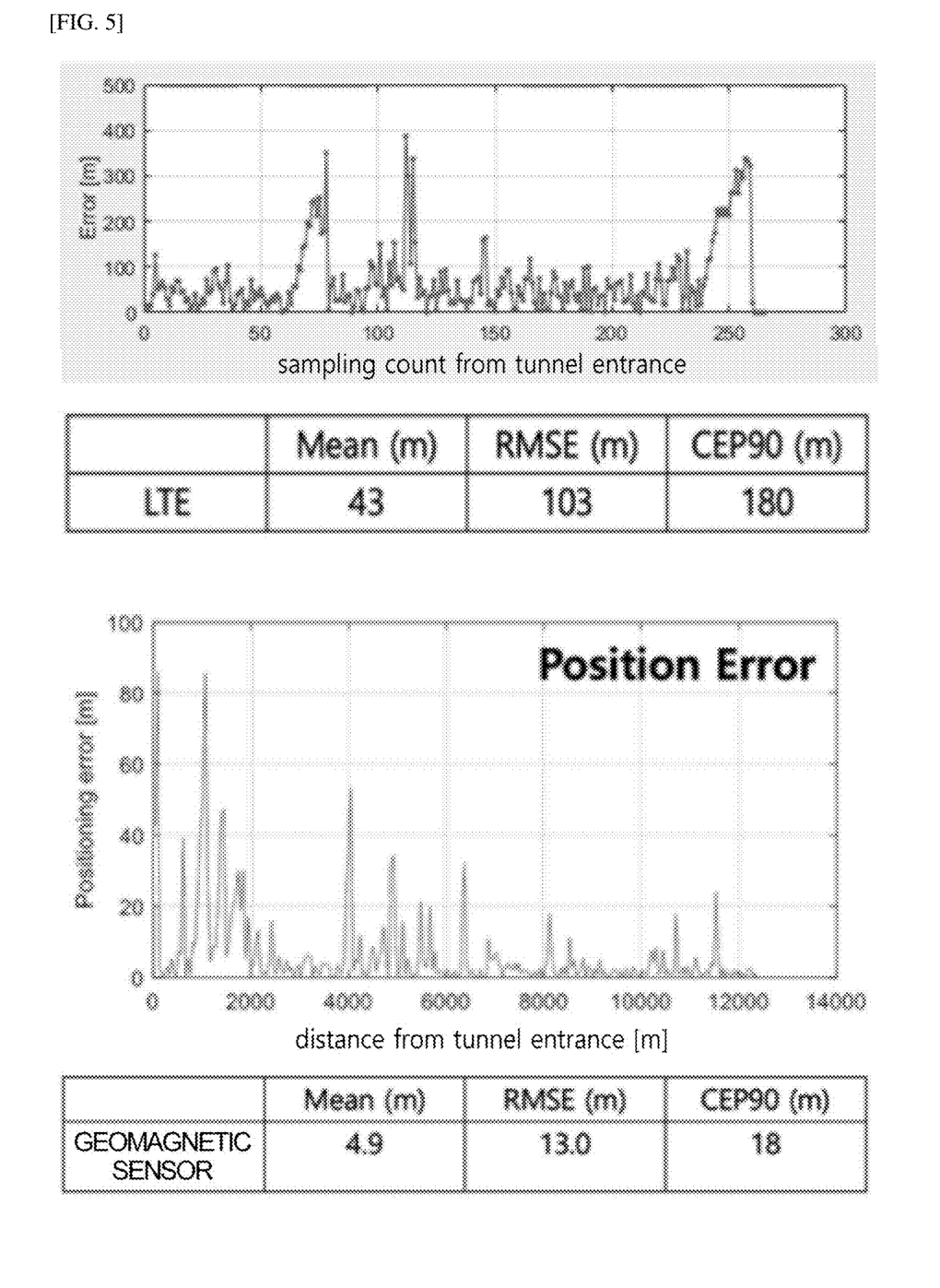
FIG. 5 is a diagram illustrating comparison between a result of recognizing a vehicle position inside a tunnel using a geomagnetic sensor according to the embodiment of the present disclosure and a result of recognizing a vehicle position inside a tunnel using an LTE signal.

FIG. 5 is a diagram illustrating comparison between a result of recognizing a vehicle position inside a tunnel using a geomagnetic sensor according to the embodiment of the present disclosure and a result of recognizing a vehicle position inside a tunnel using an LTE signal.

It was confirmed that the result of recognizing the vehicle position using the geomagnetic sensor has about 10 times higher accuracy than the result of recognizing the vehicle position using the LTE signal under the same experiment conditions.

Meanwhile, the embodiments of the present disclosure can be implemented as computer-readable codes on a computer-readable recording medium. The computer-readable recording medium includes all types of recording devices in which data readable by a computer system is stored.

Examples of the computer-readable recording medium include a ROM, a RAM, a CD-ROM, a magnetic tape, a floppy disk, and an optical data storage device, and also include carrier waves (such as data transmission over the Internet). Further, the computer-readable recording medium may be distributed over computer systems connected to a network, and computer-readable code may be stored and executed in a distributed manner. A functional program, code, and code segments for implementing the present disclosure may be easily construed by programmers skilled in the art to which the present disclosure pertains.

Since various modification examples may be made by the configurations and methods described and illustrated herein without departing from the scope of the present disclosure, all matters included in the detailed description or illustrated in the accompanying drawings are illustrative and are not intended to limit the present disclosure. Therefore, the scope of the present disclosure is not limited by the above-described exemplary embodiments and should be defined only in accordance with the claims and their equivalents.

What is claimed is:

1. A vehicle position recognition method using a geomagnetic sensor, the vehicle position recognition method comprising:
    recognizing a position of a vehicle through a GPS before entrance to an area in which position recognition through the GPS is impossible;
    measuring a geomagnetic sensor value of a user device at the recognized position of the vehicle;
    loading, to the user device, a geomagnetic value measured and stored in a database in advance at the recognized position of the vehicle;
    comparing the geomagnetic value loaded through the database with the geomagnetic sensor value measured by the user device and calibrating a geomagnetic sensor of the user device on the basis of the geomagnetic value loaded through the database; and
    recognizing the position of the vehicle in the area in which the position recognition is impossible by using the calibrated geomagnetic sensor of the user device.

2. The vehicle position recognition method according to claim 1, wherein when the vehicle passes through several areas in which position recognition through a GPS is impossible, the geomagnetic sensor of the user device performs the calibration each time before entrance to the area in which the position recognition through the GPS is impossible.

3. The vehicle position recognition method according to claim 1, wherein the geomagnetic value stored in the database is periodically updated in a manner including user feedback, and the updated geomagnetic value is able to be loaded to the user device.

4. The vehicle position recognition method according to claim 1, wherein the area in which the position recognition through the GPS is impossible is a tunnel.

5. The vehicle position recognition method according to claim 1,
    wherein the recognizing of the position of the vehicle through the GPS before the entrance to the area in which the position recognition through the GPS is impossible includes:
    recording a position recognized through the GPS as the vehicle moves and a geomagnetic value measured at the position as a pair; and
    determining the position of the vehicle before the entrance to the area in which the position recognition through the GPS is impossible from the last recorded pair of position and geomagnetic value when a loss of a GPS signal is detected.

6. The vehicle position recognition method according to claim 1, further comprising:
    constructing a shaded area map in advance from information on the area in which the position recognition through the GPS is impossible,
    wherein the recognizing of the position of the vehicle through the GPS before the entrance to the area in which the position recognition through the GPS is impossible includes:
    predicting a point in time at which the vehicle enters the area in which the position recognition through the GPS is impossible as the vehicle moves, on the basis of the shaded area map; and
    acquiring the position of the vehicle through the GPS at the predicted point in time at which the vehicle enters the area in which the position recognition through the GPS is impossible.

* * * * *